(12) United States Patent
Fortune

(10) Patent No.: US 6,997,278 B2
(45) Date of Patent: Feb. 14, 2006

(54) TORQUE-BASED OCCUPANT WEIGHT ESTIMATION APPARATUS FOR A VEHICLE SEAT

(75) Inventor: Duane D. Fortune, Lebanon, IN (US)

(73) Assignee: Delphi Technologies, Inc., Troy, MI (US)

( * ) Notice: Subject to any disclaimer, the term of this patent is extended or adjusted under 35 U.S.C. 154(b) by 307 days.

(21) Appl. No.: 10/666,768

(22) Filed: Sep. 18, 2003

(65) Prior Publication Data

US 2005/0061554 A1   Mar. 24, 2005

(51) Int. Cl.
B60R 21/32 (2006.01)
G01G 21/08 (2006.01)

(52) U.S. Cl. .................. 180/273; 280/735; 177/136; 177/144; 177/256; 177/DIG. 9

(58) Field of Classification Search ............... 180/273; 280/735; 177/136–144, 256–259, DIG. 9
See application file for complete search history.

(56) References Cited

U.S. PATENT DOCUMENTS

| 3,109,621 A | * | 11/1963 | Simons et al. ............... 248/564 |
| 3,938,603 A | * | 2/1976 | Shoberg et al. ............. 177/211 |
| 4,064,955 A | * | 12/1977 | Dyck .......................... 177/134 |
| 4,098,357 A | * | 7/1978 | Harder, Jr. .................. 248/575 |
| 4,872,523 A | * | 10/1989 | Skibinski .................... 177/255 |
| 5,474,327 A |   | 12/1995 | Schousek .................... 280/735 |
| 5,987,370 A |   | 11/1999 | Murphy et al. .............. 701/45 |
| 6,101,436 A |   | 8/2000 | Fortune et al. .............. 701/45 |
| 6,242,701 B1 | * | 6/2001 | Breed et al. ................. 177/144 |
| 6,246,936 B1 |   | 6/2001 | Murphy et al. .............. 701/45 |
| 6,267,344 B1 | * | 7/2001 | Tateyama et al. ........... 248/421 |
| 6,293,585 B1 | * | 9/2001 | Bruns et al. ................. 280/735 |
| 6,490,936 B1 |   | 12/2002 | Fortune et al. ......... 73/862.581 |

OTHER PUBLICATIONS

Research Disclosure #41520 Fluid Load Cell Classification Systems Nov. 10, 1998.
Research Disclosure #41542 Beam concepts For Load Cells Nov. 10, 1998.
Research Disclosure #41549 Parallel Guide mechanism for A Load Cell.
Research Disclosure #41559 Load Cell Designs Incorporating Spring Pre-Load.

* cited by examiner

Primary Examiner—Randy W. Gibson
(74) Attorney, Agent, or Firm—Stefan V. Chmielewski

(57) ABSTRACT

A torque-based occupant weight estimation apparatus for a vehicle seat includes front and rear torsion bars through which the seat frame is coupled to a set of floor brackets. The torsion bars are rotatably mounted on the floor brackets, and linkage arms rigidly coupled to opposing ends of each torsion bar are rotatably coupled to the seat frame so as to convert occupant seat weight into torsion bar torque. Torque sensors coupled to the torsion bars provide an indication of occupant weight.

6 Claims, 1 Drawing Sheet

TORQUE-BASED OCCUPANT WEIGHT ESTIMATION APPARATUS FOR A VEHICLE SEAT

TECHNICAL FIELD

This invention is directed to apparatus for detecting the weight of an occupant of a motor vehicle seat for purposes of determining whether and how forcefully to deploy supplemental restraints, and more particularly to apparatus for measuring forces applied to a frame of the vehicle seat.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criterion to distinguish between an adult and an infant or small child.

Most prior weight estimation techniques involve installing a pressure sensitive element such as a variable resistance pad or a fluid-filled bladder in or under a vehicle seat cushion, and utilizing the pressure measurement as an indication of occupant weight. See, for example, the U.S. Pat. Nos. 5,474,327, 5,987,370, 6,246,936, 6,101,436 and 6,490,936.

Alternatively, the occupant weight may be measured with one or more strain gauges or load cells that sense the forces (strain or pressure) that the seat applies to a bracket that supports the seat on the vehicle floor. See, for example, the U.S. Pat. No. 5,942,695 and the Publication Nos. 41520, 41542, 41549 and 41559 from the November, 1998 issue of Research Disclosure.

SUMMARY OF THE INVENTION

The present invention is directed to a torque-based occupant weight estimation apparatus for a vehicle seat, where the seat frame is coupled to a set of floor brackets through front and rear torsion bars. The torsion bars are rotatably mounted on the floor brackets, and linkage arms rigidly coupled to opposing ends of each torsion bar are rotatably coupled to the seat frame so as to convert occupant seat weight into torsion bar torque. Torque sensors coupled to the torsion bars provide an indication of occupant weight.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
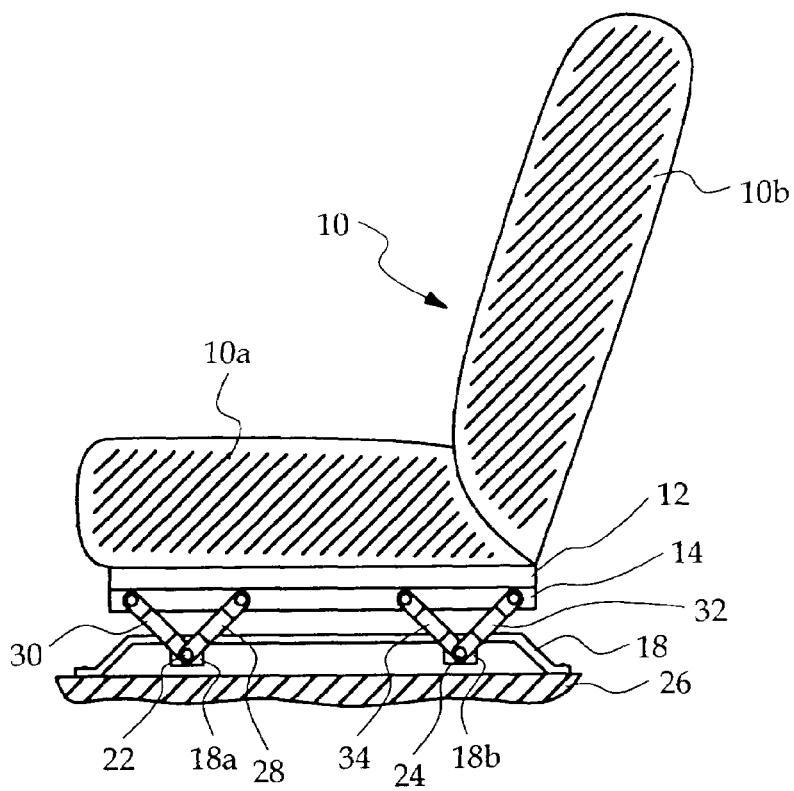
FIG. 1 is a side-view diagram of a vehicle seat incorporating the torque-based occupant weight estimation apparatus of the present invention, with portions of the seat frame removed to illustrate the operation of the invention.
Figure 2:
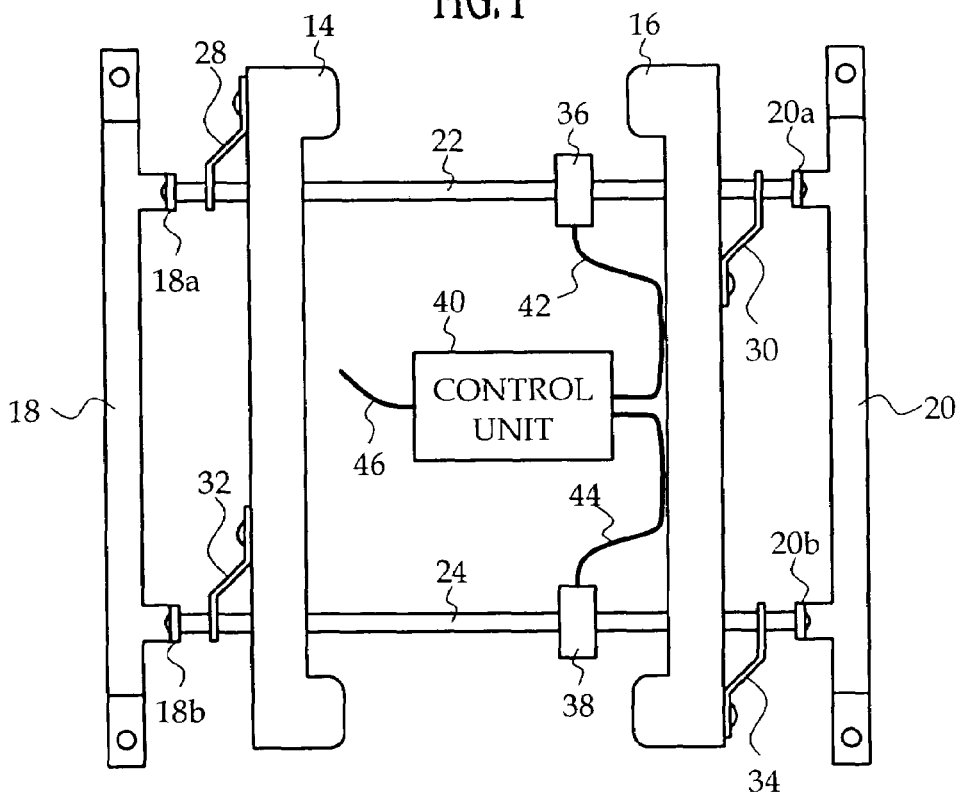
FIG. 2 is a top view of the apparatus of FIG. 1, with the seat and seat frame removed.

Referring to FIGS. 1–2, the reference numeral 10 generally designates a vehicle seat, including seat and backrest cushions 10a, 10b supported on a frame 12. The frame 12 rides on a pair of laterally spaced seat tracks 14, 16; the tracks 14, 16 are coupled to respective floor brackets (also known as risers) 18, 20 through front and rear torsion bars 22, 24, and the floor brackets 18, 20 are bolted to the vehicle floor 26. The front and rear torsion bars 22, 24 are rotatably supported by the floor brackets 18, 20, via a set of inboard downwardly depending flanges 18a, 18b; 20a, 20b, and a set of four linkage arms 28, 30, 32, 34 couple the seat tracks 14, 16 to the torsion bars 22, 24. The linkage arms 28, 30, 32, 34 are welded (or otherwise rigidly secured) to the respective torsion bars 22, 24, but rotatably coupled to the respective seat tracks 14, 16 so that occupant weight applied to seat 10 imparts a corresponding overall torque to the torsion bars 22, 24. The linkage arms 28, 30, 32, 34 are disposed oppositely about the respective torsion bars 22, 24 so that the imparted torques are additive. For example, the linkage arm 28 is disposed forward of the torsion bar 22 to impart counter-clockwise torque, and the opposing linkage arm 30 is disposed rearward of the torsion bar 22 to impart clockwise torque. The torques imparted to torsion bar 22 by the linkage arms 28 and 30 are measured by the torque sensor 36 disposed between the linkage arms 28 and 30, and the torques imparted to torsion bar 24 by the linkage arms 32 and 34 are measured by the torque sensor 38 disposed between the linkage arms 32 and 34. The torque sensors 36 and 38 are preferably magneto-elastic torque sensors such as manufactured by Magnetoelastic Devices, Inc., Pittsfield, Mass., but other sensors responsive to the imparted torques may also be used. The torque signals produced by sensors 36 and 38 are applied as inputs to control unit 40 via lines 42 and 44; the controller 40 sums the measured torques to develop an indication of occupant weight or weight classification for purposes of deciding whether and how forcefully to deploy supplemental restraints designed to protect the occupant from serious injury in a crash event, and produces a corresponding output on line 46.

In summary, the present invention provides a seat frame-based occupant weight estimation apparatus including front and rear torsion bars 22, 24 and a set of linkage arms 28, 30, 32, 34 that translate vertical force associated with occupant weight to torsion bar torques that are sensed by a torque sensors 36, 38. While illustrated with respect to the illustrated embodiments, it will be recognized that various modifications in addition to those mentioned above may occur to those skilled in the art. For example, the linkage arms 28, 30, 32, 34 could be located inboard of the seat tracks 14, 16, and so on. Accordingly, it will be understood that devices incorporating these and other modifications may fall within the scope of this invention, which is defined by the appended claims.

What is claimed is:

1. Apparatus for estimating the weight of an occupant of a vehicle seat supported by first and second laterally separated floor brackets, the apparatus comprising:

at least a first torsion bar extending between said first and second floor brackets and rotatably supported thereby;

first and second laterally separated linkage arms coupling a frame of said seat to said first torsion bar for imparting a torque to first torsion bar in relation to said occupant weight; and a first sensor for measuring the torsion bar torque between said linkage arms to provide an indication of said occupant weight.

2. The apparatus of claim 1, wherein said linkage arms are rigidly coupled to said first torsion bar and rotatably coupled to said seat frame.

3. The apparatus of claim 1, wherein said first linkage arm is disposed forward of said first torsion bar and said second linkage arm is disposed rearward of said first torsion bar so that the torsion bar torque between said linkage arms is indicative of occupant weight applied to said linkage arms.

4. The apparatus of claim 1, wherein said first sensor is a magneto-elastic torque sensor.

5. The apparatus of claim 1, including first and second torsion bars disposed at front and rear portions of said seat.

6. The apparatus of claim 1, further comprising:

a second torsion bar extending between said first and second floor brackets and rotatably supported thereby;

third and fourth laterally separated linkage arms coupling said seat frame to said second torsion bar for imparting a torque to second torsion bar in relation to said occupant weight;

a second sensor for measuring the torsion bar torque between said third and fourth linkage arms; and a control unit responsive to said first and second sensors for estimating said occupant weight based on a sum of the torsion bar torques measured by said first and second sensors.

* * * * *